F. E. CORWIN.
OIL PURIFYING APPARATUS.
APPLICATION FILED MAR. 7, 1914.
1,161,197.
Patented Nov. 23, 1915.
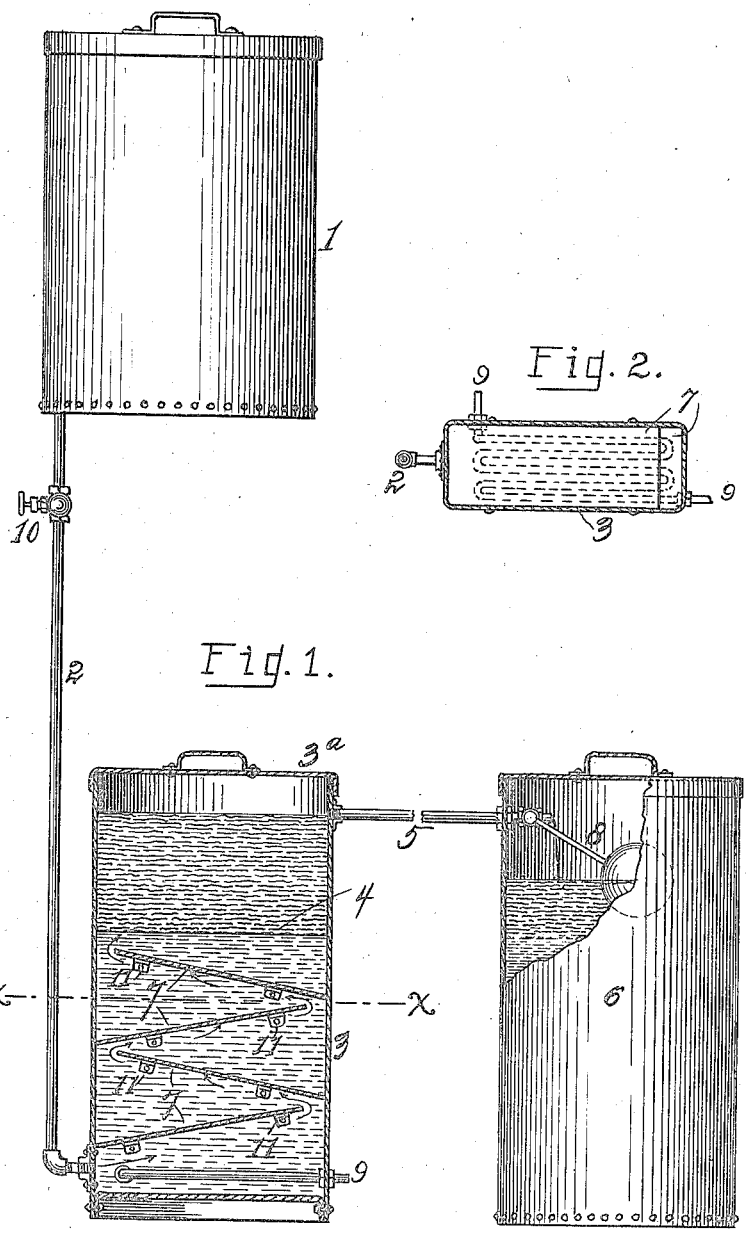

UNITED STATES PATENT OFFICE.

FRANK E. CORWIN, OF TOLEDO, OHIO.

OIL-PURIFYING APPARATUS.

1,161,197.    Specification of Letters Patent.    Patented Nov. 23, 1915.

Application filed March 7, 1914. Serial No. 823,045.

*To all whom it may concern:*

Be it known that I, FRANK E. CORWIN, a citizen of the United States, residing at Toledo, in the county of Lucas and State of Ohio, have invented certain new and useful Improvements in Oil-Purifying Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for purifying oils which have been used for lubricating purposes, and is designed to remove dirt, sediment and metallic particles in order to render such oils fit for re-use.

To this end my invention consists of the devices and construction hereinafter described, and shown and illustrated in the accompanying drawings, in which—

Figure 1, is a side-elevation of an apparatus embodying the principles of my invention, this figure being partly in vertical section, and Fig. 2, a top plan-view in section, taken on line $x$—$x$, Fig. 1.

Like numerals indicate like parts throughout the drawings.

In the drawings, 1 is an elevated container for the oil to be treated. From the bottom of this container leads a pipe 2 into the lower part of the chamber of a vessel 3. The lower part of this chamber is filled with water up to line 4. From the top portion of the chamber of vessel 3 leads a pipe 5 into a vessel 6 designed for the reception of the clean oil. In the chamber of the vessel 3 is a series of permanently magnetized plates 7 disposed one above another and inclined alternately at opposite inclinations. The lower edge of each of these plates rests against the end-walls of the vessel 3, so that oil entering the chamber of the vessel 3 below the lower plate 7 will, by reason of its levity, move upwardly in a zigzag or sinuous course along the under side of each of the plates 7 until it reaches and rests upon the top of the body of water 4. When this oil reaches a sufficient height, it will overflow through pipe 5 into the vessel 6. The vessel 3 is provided with a tight removable cover 3ᵃ. In the vessel 6 is a float-valve 8 which automatically stops the operation of the apparatus when the oil has risen in the vessel 6 to a predetermined height. In the bottom of the chamber of the tank 3 is a steam or hot water coil 9 for warming or heating the contents of the vessel and which is found to greatly expedite the purification process.

The operation of my device will now be obvious. The dirty oil from tank 1 passes through a strainer, not shown, down through pipe 2 into the bottom in the chamber of vessel 3 and below the lower plate 7. By means of cock 10 this flow of oil is restricted so that the oil is fed into the vessel 3 in large drops which roll upwardly along the under side of the successive plates 7. The steel particles carried by the oil are caught and retained by the magnetic plates; other particles are, by the slight agitation of the drops of oil in the water, washed from the oil and these settle upon the bottom of the vessel 3 or upon the top of the plates 7, the result being that when the oil passes out from beneath the top plate 7, it has given up nearly if not all of its foreign matter.

The edges of the plates 7 fit snugly against three walls of the vessel 3 and rest upon small inwardly projecting lugs 11 secured to the inner sides of the walls of the vessel. It will be seen that by removing the cover 3ᵃ, the plates 7 may be readily lifted out,—the contents of the vessel having been first withdrawn through a cock not shown,—and now the plates and the entire vessel may be readily cleansed by a steam-jet or otherwise as may be desired.

While I have shown but one of the vessels 3 and its contents it is evident that there may be a series of such vessels connected together and interposed between the tanks 1 and 6. It is also evident that there will suggest themselves various modifications of my device by which dirty oils may be caused to percolate upwardly through a body of water and in the presence of magnets, to remove impurities, which is the essence of my invention, and I do not, therefore, limit my invention to the structural details here indicated.

Having described my invention, what I claim and desire to secure by Letters Patent, is—

1. In an apparatus of the described character, a vessel, in the vessel a body of liquid of greater gravity than oil, means for feeding oil into the lower part of such body of liquid, and a series of oppositely inclined permanently magnetized plates disposed one above another, the lower edges of alternate plates resting against opposite walls of the vessel, whereby there is formed an upward sinuous path through said body of liquid.

2. In an apparatus of the described character, an elevated tank for dirty oil, a tank for clean oil, an intermediate vessel having its chamber connected at bottom with said dirty oil tank and at top with said clean oil tank, and a series of oppositely inclined permanently magnetized plates in said intermediate vessel disposed one above another.

3. In an apparatus of the described character, an elevated tank for dirty oil, a tank for clean oil, an intermediate vessel having its chamber connected at bottom with said dirty oil tank and at top with said clean oil tank, a series of oppositely inclined permanently magnetized plates in said intermediate vessel disposed one above another, a body of liquid in said intermediate vessel of greater gravity than oil, the arrangement of the magnets being such that a sinuous path is formed for oil moving upwardly through said body of liquid.

4. An apparatus of the described character comprising a vessel, the chamber of which has an inlet near its bottom and an outlet near its top, in the chamber of said vessel a series of permanently magnetized plates disposed one above another and inclined upwardly and alternately at opposite inclinations, the lower edges of alternate plates resting against opposite walls of the vessel, whereby there is formed an upward sinuous path from said inlet toward said outlet, means for the detachable support of said plates, a body of liquid in said vessel which submerges said plates, and means for heating said body of liquid.

In testimony whereof I affix my signature in presence of two witnesses.

FRANK E. CORWIN.

Witnesses:
 EDWARD G. KIRBY,
 GERTRUDE BRACKER.